UNITED STATES PATENT OFFICE.

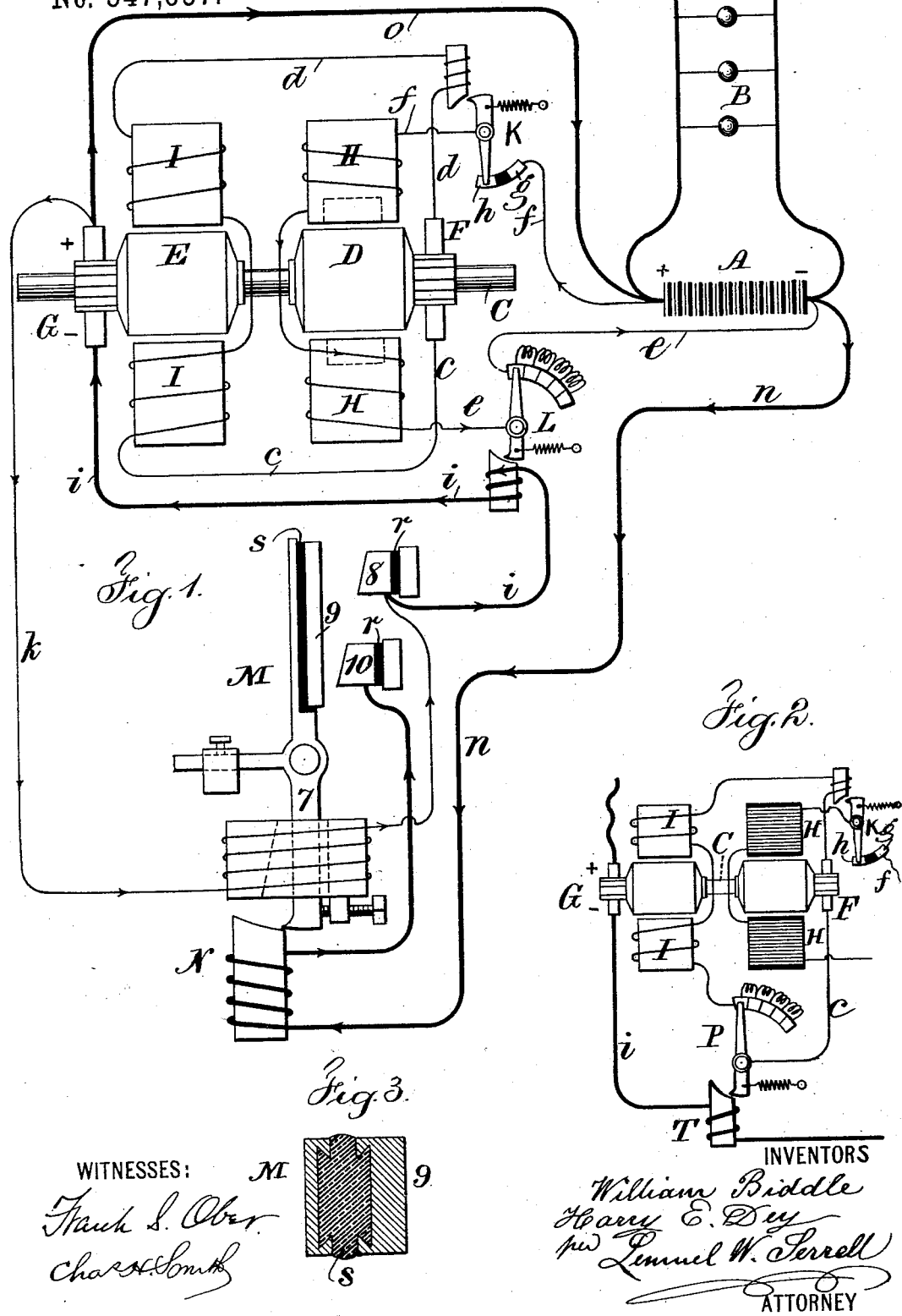

WILLIAM BIDDLE AND HARRY E. DEY, OF BROOKLYN, NEW YORK, ASSIGNORS TO SAID BIDDLE.

ELECTRIC CAR-LIGHTING.

SPECIFICATION forming part of Letters Patent No. 547,537, dated October 8, 1895.

Application filed January 9, 1895. Serial No. 534,319. (No model.)

*To all whom it may concern:*

Be it known that we, WILLIAM BIDDLE and HARRY E. DEY, citizens of the United States, residing at Brooklyn, in the county of Kings and State of New York, have invented an Improvement in Electric Car-Lighting, of which the following is a specification.

The object of this invention is to so apply the electric currents in a dynamo that the output of the current from the armature will be uniform, or nearly so, regardless of the speed with which the armature is rotated by a connection to the car-axle, and I employ in connection with such dynamo an automatic switch for breaking the circuit when the speed of rotation of the armature is reduced.

In the drawings, Figure 1 is a diagram representing the circuit connections between the secondary battery and the dynamo and the circuit-breaker. Fig. 2 is a partial diagram representing a modification in the circuit connections of the dynamo, and Fig. 3 is a cross-section through the circuit-closer of the switch.

The secondary battery is illustrated at A and the incandescent lamps at B in multiple arc in the circuit of the secondary battery. The armature-shaft C is to be driven by any suitable connection to the axle of the car, and upon this armature-shaft are two armatures D and E, with separate commutator plates and brushes at F and G, and there are separate sets of field-magnets, the field-helices H and their pole-pieces acting in connection with the armature D, and the field-helices and their pole-pieces I acting in connection with the armature E, and the field-helices I are connected to the brushes of the commutator F by the circuit-wires $c$ and $d$, and the field-helices H are so wound as to set up opposite polarity to the helices I, and these helices H are connected by the circuit-wires $e$ and $f$ with the secondary battery A, and there is an electromagnetic switch K, the helix of which is in the circuit to the commutator F, and there are insulated contacts $g$ and $h$ for this switch K, the contact $g$ being connected to the wire $f$, leading to the secondary battery A, and there is also an electromagnetic rheostat L, the helix of which is in the circuit $i$ from the brushes of the commutator G, and the coils of the rheostat are in the circuit $e$, leading to the secondary battery.

The circuit-breaker M is provided with a pole-piece 7, that is magnetized by the current passing from one of the brushes of the commutator G through the wire $k$ to the contact 8, and thence by the wire $i$ to the other brush of the commutator G, and there is a wire $n$ passing from one pole of the secondary battery A through the helix of the electromagnet N, which when energized acts upon the pole-piece 7 and brings the contact-plate 9 against the contacts 8 and 10 to close the circuit from the secondary battery through the commutator-brushes G.

The operation of this device is as follows: When the armature-shaft C is rotated, a current is set up in consequence of the residual magnetism in the field-cores, which field-cores are advantageously provided with hardened steel blocks, as indicated by the dotted lines, for retaining sufficient magnetism to start the apparatus, and the current set up in the armature D passes by the commutator F and circulates directly through the field-helices I of the armature E. When the current thus generated, acting in the helix of the electromagnetic switch K, is sufficient to move the switch K so that the end thereof comes in contact with the plate G, the power of the secondary battery A is placed upon the helices H and the magnetism is augmented and the current is increased through the commutator F and wires $c$ $d$, leading to the helices I, and in so doing the output of current from the armature E through the commutator G will be increased and the current will circulate from the commutator G through the circuit-wires $k$ and $i$, and as soon as the current is sufficient to develop magnetism in the pole-piece 7 the circuit-breaker M will be moved, bringing the plate 9 upon the contacts 8 and 10, and the circuit will then be closed from the commutator G through $i$, 8, 9, 10, $n$, A, and $o$, thus directing the current developed in the armature E through the secondary battery, and the circuit-breaker M will be kept in position with the circuit between 8 and 10 closed, because both the electromagnet N and the pole-piece 7 of the circuit-breaker M will act in the same direction to maintain a proper contact between 8, 9, and 10; but when the current of the secondary battery overpowers the armature-current the kick back of N breaks the main-line circuit between 8 and 10. It will now be observed that the helix of the electromagnetic rheostat L is in the main circuit, and when the output of current from the armature E is excessive the lever of the rheostat will be moved and a greater resistance thrown into the circuit from the secondary battery than passes through the field-helices H, and consequently the output of current from the armature D will be lessened, and in a corresponding degree the energy of the field-helices I will be reduced, because the current from the armature B and commutator F will be lessened, and in this manner a regulation will be effected that will substantially cause the output of current from the armature E to be uniform, and when the speed of rotation of the armature is so reduced that the current developed in the armature E is less than that set up by the secondary battery A the magnetism in N and in the pole-piece 7 will be reduced or destroyed, so that the contact-plate 9 will separate from the contacts 8 and 10 and break the circuit of the secondary battery passing to the brushes of the commutator G, and at the same time the rotation of the armature D, being slowed down, the output of current through the commutator F will be insufficient to energize the core of the electromagnetic switch K, and the spring thereof will cause such switch to separate from the plate $g$, and the circuit through the field-helices H will thereby be broken, so that when the speed of rotation of the armature-shaft and armatures sinks below the minimum to which the apparatus is adjusted the secondary battery is cut out from the dynamo-circuits, and it is automatically restored to such circuits when the speed of rotation of the armature-shaft and armatures is sufficient for developing an electromotive force equal to that in the secondary battery. It will be observed that this dynamo is efficient in the development of the current in the proper direction for the secondary battery no matter which way the armature-shaft and armatures may rotate, because the field-helices H are in the circuit of the secondary battery, and the current will circulate through the commutator F, wires $e$ $d$, and helices I in one direction when the armature is rotated one way, and in the other direction when the armature is rotated the other way, and hence the poles of the field-magnets I will change polarity according to the direction of rotation of the armature, and the output of current from the commutator G will always be in the same direction. Hence it is unnecessary to interpose a circuit-changer or reversing-switch between the commutator and the secondary battery, and it is only necessary to employ a suitable circuit-breaker, such as the circuit-breaker M, which will break the main-line circuit between the commutator G and the secondary battery whenever the electromotive force from the armature E sinks below that from the secondary battery A.

In order to insure reliable and extended contacts between the surfaces of the blocks 8 and 10 and the contact-plate 9, I place between the blocks 8 and 10 and their respective supports pieces of soft rubber $r$, which will yield and allow the blocks 8 and 10 to move slightly, and upon the lever of the contact-breaker M soft rubber is placed, as at $s$, between such lever and the plate 9, and it is advantageous to insert such rubber into dovetailed recesses in their respective surfaces, as shown in section in Fig. 3. These plates 8, 9, and 10 present sufficiently-extended surface-contacts to prevent development of heat.

In Fig. 2 the circuit arrangements are substantially the same as in Fig. 1, with the exception that we have shown a rheostat P in the circuit $c$, leading from the commutator-brushes F. The lever of this rheostat is moved by an electromagnet T, the helix of which is in the main circuit $i$, leading from the commutator-brushes G, the object being to place more or less resistance in the circuit passing to the field-helices I from the commutator F, according to the current flowing through the main line from the commutator G, thereby lessening the current flowing from the commutator-brushes F through the helices I when the main current flowing from the commutator G is augmented, using this as a means of regulation of the current in the main line from the dynamo to the battery. The two armatures are not necessarily on one shaft, as the shafts may be separate and driven separately.

We claim as our invention—

1. The combination in an electric car lighting apparatus, with the secondary battery and the lighting circuit, of a dynamo having two armatures and two sets of field magnets the helices of one set of field magnets being in circuit with the secondary battery, and the helices of the second set of field magnets being in a circuit from the brushes of the first armature, and the brushes of the second armature being in the main circuit to the secondary battery, substantially as set forth.

2. The combination in a car lighting apparatus with the secondary battery and light circuit, of a dynamo having two armatures, two sets of commutators and brushes, and separate field helices for each armature, circuit connections to the secondary battery from the field helices of one armature, and circuit connections from that armature to the field helices of the other armature, and circuit connections to the secondary battery substantially as specified whereby the change of rotation of the armatures according to the direction of motion of the car causes a uniform development in the direction of current in the circuit connections to the secondary battery, substantially as set forth.

3. The combination in a car lighting apparatus with the secondary battery and light circuit, of a dynamo having two armatures, two sets of commutators and brushes, and separate field helices for each armature, circuit connections to the secondary battery from the field helices of one armature, and circuit connections from that armature to the field helices of the other armature, and circuit connections to the secondary battery substantially as specified whereby the change of rotation of the armatures according to the direction of motion of the car causes a uniform development in the direction of current in the circuit connections to the secondary battery, an electro-magnetic switch for breaking the current between the secondary battery and the first set of field helices when the current from the second armature to the secondary battery is diminished by the slow speed of the armature, substantially as set forth.

4. The combination in a car lighting apparatus with the secondary battery and light circuit, of a dynamo having two armatures, two sets of commutators and brushes, and separate field helices for each armature, circuit connections to the secondary battery from the field helices of one armature, and circuit connections from that armature to the field helices of the other armature, and circuit connections to the secondary battery substantially as specified whereby the change of rotation of the armatures according to the direction of motion of the car causes a uniform development in the direction of current in the circuit connections to the secondary battery, a rheostat and electro-magnet the helix of which is in the main circuit for varying the resistance in the circuit from the secondary battery to the field helices, substantially as set forth.

5. The combination in a car lighting apparatus with the secondary battery and light circuit, of a dynamo having two armatures, two sets of commutators and brushes, and separate field helices for each armature, circuit connections to the secondary battery from the field helices of one armature, and circuit connections from that armature to the field helices of the other armature, and circuit connections to the secondary battery substantially as specified whereby the change of rotation of the armatures according to the direction of motion of the car causes a uniform development in the direction of current in the circuit connections to the secondary battery, an electro-magnetic circuit breaker for opening and closing the main circuit according to the current flowing in such main circuit, substantially as set forth.

6. The combination in a car lighting apparatus with the secondary battery and light circuit, of a dynamo having two armatures, two sets of commutators and brushes, and separate field helices for each armature, circuit connections to the secondary battery from the field helices of one armature, and circuit connections from that armature to the field helices of the other armature, and circuit connections to the secondary battery substantially as specified whereby the change of rotation of the armatures according to the direction of motion of the car causes a uniform development of the direction of current in the circuit connections to the secondary battery, a circuit breaker and a helix in a closed circuit between the brushes of the second armature for magnetizing the pole piece of the circuit breaker, and an electro-magnet the helix of which is in the main line for giving reverse motion to the pole piece and circuit breaker, substantially as set forth.

7. The combination in an electric car lighting apparatus with the secondary battery and dynamo, of a circuit closing plate and an electro magnet for moving the same and two contact plates of sufficient size to prevent the development of heat, and soft rubber supports for such contact plates that allow them to conform to the surface of the circuit closing plate substantially as specified.

8. The combination in a car lighting apparatus, of a secondary battery and light circuit, a dynamo having two armatures and two sets of field magnets, circuit connections between the helices of one set of field magnets and the secondary battery for energizing such field magnets by the secondary battery, a switch for breaking the said circuit, circuit connections between the commutator of one armature and the helices in the fields of the other armature, a main line circuit for charging the secondary battery, and a rheostat and electro-magnet for actuating the same to unify the current to the battery under varying speeds of rotation of the armatures, substantially as set forth.

Signed by us this 7th day of January, A. D. 1895.

WILLIAM BIDDLE.
HARRY E. DEY.

Witnesses:
   HAROLD SERRELL,
   S. T. HAVILAND.